(12) United States Patent
Rohlf

(10) Patent No.: US 7,843,349 B2
(45) Date of Patent: Nov. 30, 2010

(54) RETROFITTABLE RADIO FREQUENCY IDENTIFICATION CONNECTOR

(75) Inventor: Bradley A. Rohlf, Lakeville, MN (US)

(73) Assignee: D B Industries, Inc., Red Wing, MN (US)

( * ) Notice: Subject to any disclaimer, the term of this patent is extended or adjusted under 35 U.S.C. 154(b) by 826 days.

(21) Appl. No.: 11/759,384

(22) Filed: Jun. 7, 2007

(65) Prior Publication Data

US 2008/0106420 A1 May 8, 2008

Related U.S. Application Data

(60) Provisional application No. 60/856,607, filed on Nov. 3, 2006.

(51) Int. Cl.
*G08B 13/14* (2006.01)

(52) U.S. Cl. ............... 340/572.9; 340/572.1; 340/10.1; 340/10.5

(58) Field of Classification Search ................ 340/505
See application file for complete search history.

(56) References Cited

U.S. PATENT DOCUMENTS

| | | | |
|---|---|---|---|
| 3,474,559 A | 10/1969 | Hunt | |
| 4,512,096 A | 4/1985 | Heidecker | |
| 4,612,719 A | 9/1986 | De Jong | |
| 5,758,443 A | 6/1998 | Pedrazzini | |
| 5,973,599 A | 10/1999 | Nicholson et al. | |
| 6,144,301 A * | 11/2000 | Frieden | 340/572.8 |
| 6,239,737 B1 | 5/2001 | Black | |
| 6,276,179 B1 | 8/2001 | Janssen et al. | |
| 6,666,170 B1 | 12/2003 | Hilpert | |
| 2006/0087440 A1 | 4/2006 | Klein | |
| 2006/0117619 A1 | 6/2006 | Costantini | |
| 2008/0106088 A1 * | 5/2008 | Rohlf | 283/70 |
| 2008/0106398 A1 * | 5/2008 | Rohlf | 340/532 |

FOREIGN PATENT DOCUMENTS

| | | |
|---|---|---|
| DE | 36 11 625 A1 | 10/1987 |
| DE | 39 32 066 C1 | 11/1990 |
| DE | 198 42 366 A1 | 3/2000 |
| EP | 0 692 774 A | 1/1996 |
| EP | 0 788 069 A | 8/1997 |
| FR | 2 593 219 A | 7/1987 |
| FR | 2 704 604 A1 | 11/1994 |
| GB | 2 398 454 A | 8/2004 |
| JP | 2004343834 A | 12/2004 |
| WO | WO 97/16963 | 5/1997 |
| WO | WO 98/35243 | 8/1998 |
| WO | WO 98/35243 A | 8/1998 |

(Continued)

OTHER PUBLICATIONS

Beal Services, Notice of Use—Beal Software, 18 pages (2001).

(Continued)

*Primary Examiner*—Travis R Hunnings
(74) *Attorney, Agent, or Firm*—IPLM Group, P.A.

(57) ABSTRACT

A radio frequency identification connector is configured and arranged to retrofittably connect a radio frequency identification device to an elongate member such as a safety cable.

18 Claims, 12 Drawing Sheets

FOREIGN PATENT DOCUMENTS

| | | |
|---|---|---|
| WO | WO 99/19851 A | 4/1999 |
| WO | WO 02/85106 | 1/2002 |
| WO | WO 2006/123134 A | 11/2006 |

OTHER PUBLICATIONS

Tool Hound website: http://www.toolhound.com, 1 page (known of prior to Jun. 2006).

Zgraggen, S., "Tool Loss: Seeing Red???", Construction Business Owner, pp. 10-12 and 14 (Mar. 2006).

ToolWatch website: http://www.toolwatch.com/accessories_labelstags/htm, 2 pages ( © ToolWatch Corporation) (Printed May 24, 2007).

Scafftag Safety Systems website: http://scafftag.com, SCAFFTAG—SAFETRAK Safety Management Systems—UNITAG®, 5 pages (2005).

Scafftag Safety Systems website: http://scafftag.com, "SCAFFTAG—SAFETRAK Safety Management Systems—SAFETRAK", 7 pages (2005).

HDX High Performance Ultra EID Tag—ISO Compliant, Allflex®, http://www.allflexusa.com, 2 pages (2006).

INFOCHIP Systems Inc., http://www.infochip.com, web page and 4 on-line brochures, 13 pages (2003).

"The Tracker", French Creek Production, http://www.frenchcreekproduction.com/tracker.htm, 2 pages (2002).

"Harnesses" Safetrak, www.safetrack.com, 4 pages (2005).

"Tags", Safetrak, www.safetrack.com, 3 pages (known of prior to Jun. 2006).

Scafftage® Press Release: "Microtag® Makes Harnesses Safer", 1 page (Jun. 2002).

Scafftag® Press Release: "Scafftag® Limited—The Past, Present and Future", 1 page (Jun. 2002).

"'Brand' New—Imperial College London learns the benefits of Safetrak", 1 page (known of prior to Jun. 2006).

"Pervidi™", http://www.pervidi.com, 11 pages (2005).

"PDAge—POCKET JOBSITE® Inspector", http://www.pdage.com, 6 pages (2002).

HOA Inspector™, Reef Point Technology, http://www.reefpt.com, 4 pages (known of prior to Jun. 2006).

"Low Frequency RFID Evaluation Kit—Reference Guide", Texas Instruments, 4 pages (Sep. 2002).

"Electronic ID", Allflex USA, Inc., www.allflexusa.com, 6 pages (known of prior to Jun. 2006).

"HandiGrimpe—Traceability Tools", BEAL, http://www.beal-intervention.com, 6 pages (known of prior to Jun. 2006).

* cited by examiner

RETROFITTABLE RADIO FREQUENCY IDENTIFICATION CONNECTOR

This application claims the benefit of U.S. Provisional Application Ser. No. 60/856,607, filed Nov. 3, 2006.

RELATED APPLICATIONS

This disclosure is related to the following co-pending applications: (1) "Retrofittable Radio Frequency Identification Tag" by Brent J. Knoll et al., U.S. Provisional Application Ser. No. 60/811,965, filed Jun. 8, 2006; (2) "Radio Frequency Identification Tag" by Brent J. Knoll et al., U.S. patent application Ser. No. 29/249,952, filed Oct. 27, 2006; (3) "Retrofittable Radio Frequency Identification Connectors" by Brent J. Knoll et al., U.S. Provisional Application Ser. No. 60/856,607, filed Nov. 3, 2006; (4) "Radio Frequency Identification Connectors" by Bradley A. Rohlf, U.S. Provisional Application Ser. No. 60/856,771, filed Nov. 3, 2006; (5) "Connector for Radio Frequency Identification Device" by Bradley A. Rohlf, U.S. patent application Ser. No. 29/279,897, filed May 10, 2007; (6) "Retrofittable Radio Frequency Identification Connector" by Brent J. Knoll et al., filed Jun. 7, 2007; (7) "Retrofittable Radio Frequency Identification Connector" by Bradley A. Rohlf, filed Jun. 7, 2007; (8) "Retrofittable Radio Frequency Identification Connector" by Bradley A. Rohlf et al., filed Jun. 7, 2007; (9) "Radio Frequency Identification Connector" by Bradley A. Rohlf, filed Jun. 7, 2007; and (10) "Radio Frequency Identification Connector" by Bradley A. Rohlf, filed Jun. 7, 2007; which are not admitted as prior art with respect to the present disclosure by its mention in this section.

FIELD OF THE INVENTION

The present invention relates to a retrofittable radio frequency identification connector for connecting radio frequency identification devices to an elongate member such as a safety cable.

BACKGROUND OF THE INVENTION

To comply with industry standards, safety devices used for fall protection and fall arrest purposes should be inspected by the user prior to each use and by a competent person other than the user at least annually. To demonstrate compliance with the industry standards, the results of the inspections should be recorded in an inspection and maintenance log for each safety device identified by the model number, the serial number, and the date manufactured or purchased. The inspection and maintenance log should also include information such as the date inspected, the inspection items noted, corrective action, maintenance performed, and the initials of the person who approved the inspection. Other information may also be included such as the dates of the next inspection and maintenance.

For example, some safety devices commonly include labels on which the inspection and maintenance log information may be recorded. However, these labels may become difficult to write on or read should they become soiled. If a separate inspection and maintenance log is kept, it may be difficult to locate the separate log and keep it current, especially if the log is kept in a different location than the safety devices. Therefore, it is desired to provide an inspection and maintenance log that is easily accessible and convenient to use.

The present invention addresses the problems associated with the prior art devices and provides for radio frequency identification connectors for connecting radio frequency identification devices to elongate members such as safety cables for use with inspection and maintenance logs that are easily accessible and convenient to use.

SUMMARY OF THE INVENTION

One aspect of the present invention provides an identification device connector assembly configured and arranged for retrofittable connection of an identification device to an elongate member comprising a connector including a first portion, a second portion, and a bore. The first portion and the second portion define the bore and are releasably connectable. The bore is configured and arranged to receive the elongate member.

Another aspect of the present invention provides an identification device connector assembly configured and arranged for retrofittable connection to an elongate member comprising an identification device and a housing including mating first and second housing portions. The first housing portion has a first inside surface including a first cavity and a first channel, and the second housing portion has a second inside surface including a second cavity and a second channel. The first and second inside surfaces face one another when the housing is assembled. The first and second cavities are aligned and in fluid communication with one another when the housing is assembled. The first and second channels are aligned and in fluid communication with one another when the housing is assembled. The first and second cavities are configured and arranged to receive the identification device, and the first and second channels are configured and arranged to receive the elongate member.

Another aspect of the present invention provides a method of connecting an identification device to an elongate member using a connector including first and second housing portions forming a cavity and a channel, the first and second housing portions being releasably connectable. The first and second housing portions are separated. The identification device is placed within the cavity and the elongate member is placed within the channel. The first and second housing portions are connected thus securing the identification device and the elongate member between the first and second housing portions.

DETAILED DESCRIPTION OF A PREFERRED EMBODIMENT

Figure 1:
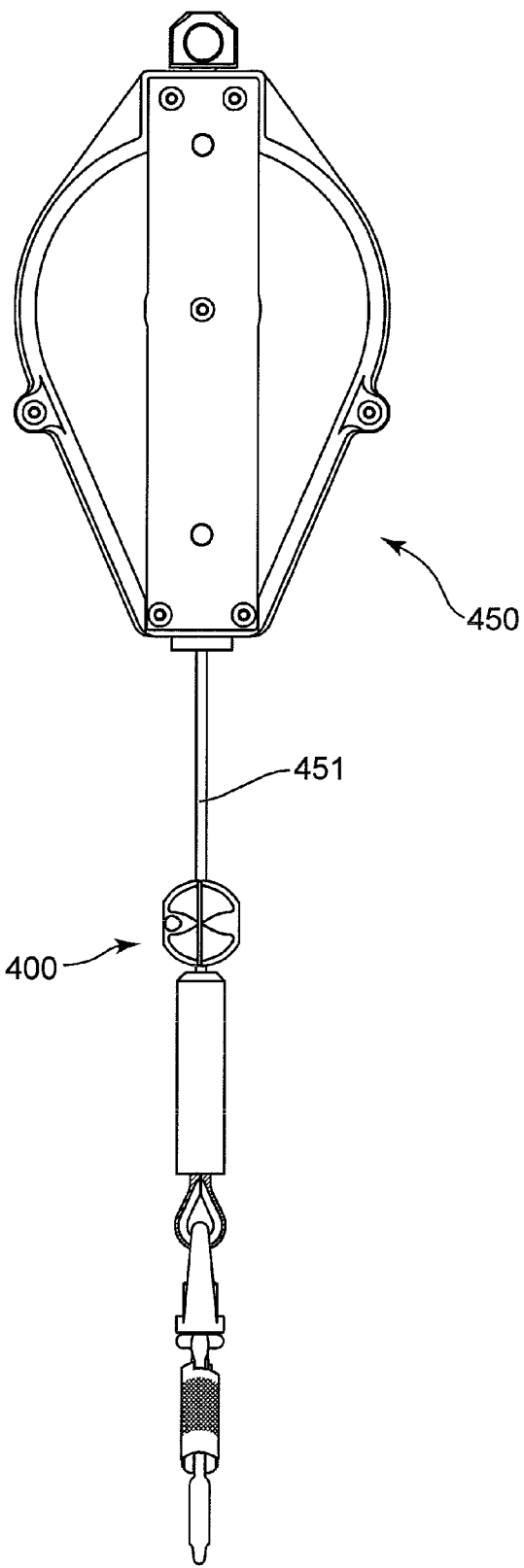
FIG. 1 is a side view of a self-retracting lifeline including a cable to which a retrofittable radio frequency identification connector constructed according to the principles of the present invention is operatively connected.

Retrofittable radio frequency identification connectors constructed according to the principles of the present invention are designated by the numerals 400, 500, 600, and 700 in the drawings.

The radio frequency identification connectors are preferably for retrofittable connection to a completed, manufactured safety device as described herein, but it is recognized that the radio frequency identification connectors may also be retrofittably connected to other devices after manufacture of the devices has been completed. An example of such a safety device is a cable 451 of a self-retracting lifeline 450 to which the radio frequency identification connectors may be retrofittably connected as shown in FIG. 1. The connectors may also be connected to any suitable elongate member. Further, although the connectors are preferably configured and arranged for retrofittable connection to a device, the connectors may be connected to a device during manufacture of the device.

Although the present invention is described herein as connectors for use with RFID devices, it is recognized that the connectors may also be used with other suitable identification devices such as, but not limited to, bar codes, serial numbers, and metallic codes. These identification devices may be used individually or in any combination with the connectors of the present invention.

Figure 2:
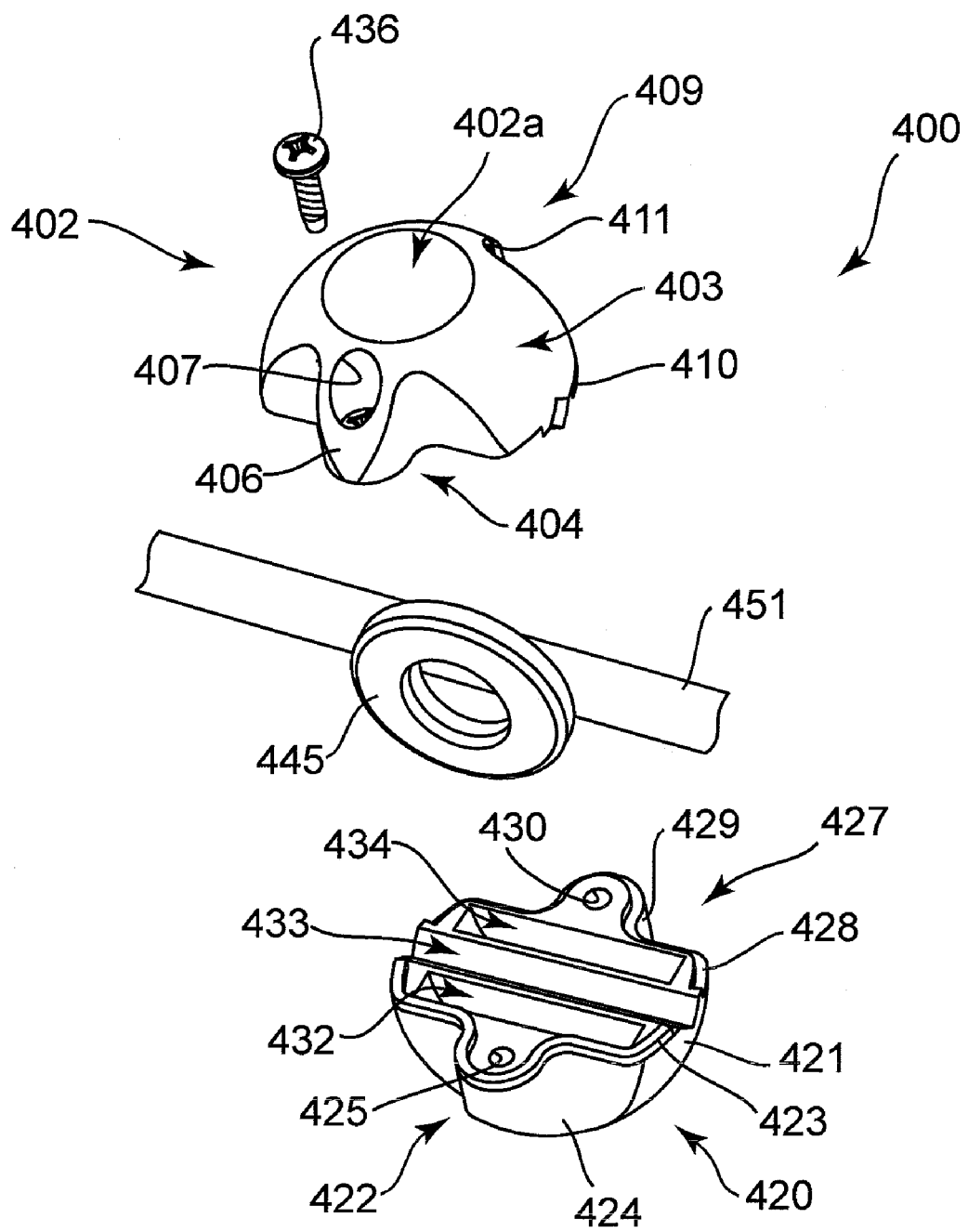
FIG. 2 is an exploded perspective view of the retrofittable radio frequency identification connector shown in FIG. 1 with a portion of the cable of the self-retracting lifeline and a radio frequency identification device.
Figure 4:
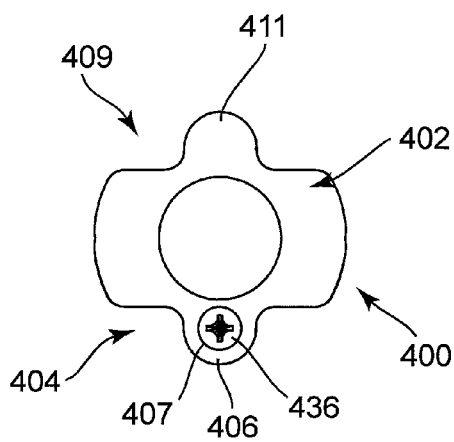
FIG. 4 is a top view of the retrofittable radio frequency identification connector shown in FIG. 3.
Figure 3:
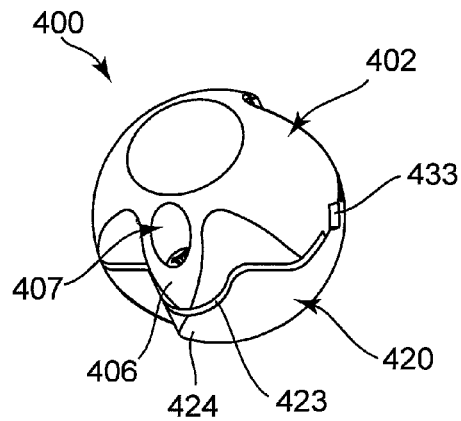
FIG. 3 is a top perspective view of the retrofittable radio frequency identification connector shown in FIG. 2 assembled.
Figure 5:
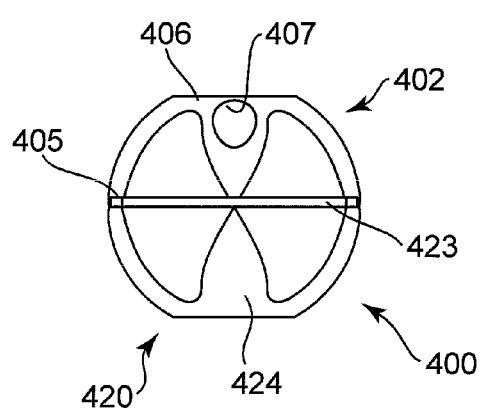
FIG. 5 is a side view of the retrofittable radio frequency identification connector shown in FIG. 3.

The radio frequency identification (hereinafter "RFID") connector 400 is shown in FIGS. 1-6 and 11-15. The connector 400 includes mating housing portions, a first housing portion 402 and a second housing portion 420, configured and arranged to interconnect an RFID device 445 and a cable 451 of a self-retracting lifeline 450. It is recognized that the connector 400 may be operatively connected to other types of devices including a cable or an elongate member. The connector 400 is described herein in the orientation in which it is shown in FIG. 2, but this description does not limit the orientation in which the connector 400 may be used as the connector 400 may be used in many different orientations.

The first housing portion 402 includes an outside surface 402a and an inside surface (not shown). The outside surface 402a includes a central portion 403 that is arched along its longitudinal axis so that the top is higher than the ends A fastener receiving portion 406 extends outward from one side of the central portion 403 proximate the top and includes a bore 407 extending through the fastener receiving portion 406 perpendicular relative to the longitudinal axis of the central portion 403, A fastener connecting portion 411 extends outward from the opposite side of the central portion 403 proximate the top and includes a threaded receptacle 412 extending from proximate the inside surface toward the outside surface 402a without extending through the fastener connecting portion 411 perpendicular relative to the longitudinal axis of the central portion 403. The first housing portion 402 is generally hemispherical-shaped with notches on each side of the fastener receiving portion 406 and on each side of the fastener connecting portion 411.

The inside surface includes a channel 415 extending longitudinally through the first housing portion 402, which defines a first side 404 and a second side 409 on opposite sides of the channel 415, parallel with the longitudinal axis of the central portion 403. The first side 404 includes the fastener receiving portion 406, and the second side 409 includes the fastener connecting portion 411. The channel 415 is preferably a V-shaped groove. The first side 404 includes a ledge 405 along its perimeter from one end of the channel 415 to the other end of the channel 415 and a first cavity 414 between the ledge 405 and the channel 415. The first cavity 414 is preferably a rectangular cavity with a longitudinal axis parallel with the channel 415. The second side 409 includes a flange 410 extending downward along its perimeter from one end of the channel 415 to the other end of the channel 415 and a second cavity 416 between the flange 410 and the channel 415. The second cavity 416 is preferably a rectangular cavity with a longitudinal axis parallel with the channel 415.

The second housing portion 420, shown in FIGS. 7-10, includes an outside surface 420a and an inside surface 420b. The outside surface 420a includes a central portion 421 that is arched along its longitudinal axis so that the top is higher than the ends. A fastener connecting portion 424 extends outward from one side of the central portion 421 proximate the top and includes a threaded receptacle 425 extending from proximate the inside surface 420b toward the outside surface 420a without extending through the fastener connecting portion 424 perpendicular relative to the longitudinal axis of the central portion 421. A fastener receiving portion 429 extends outward from the opposite side of the central portion 421 proximate the top and includes a bore 430 extending through the fastener receiving portion 429 perpendicular relative to the longitudinal axis of the central portion 421. The second housing portion 420 is generally hemispherical-shaped with notches on each side of the fastener connecting portion 424 and on each side of the fastener receiving portion 429.

The inside surface 420b includes a channel 433 extending longitudinally through the second housing portion 420, which defines a first side 422 and a second side 427 on opposite sides of the channel 433, parallel with the longitudinal axis of the central portion 421. The first side 422 includes the fastener connecting portion 424, and the second side 427 includes the fastener receiving portion 429. The channel 433 is preferably a V-shaped groove The first side 422 includes a flange 423 extending upward along its perimeter from one end of the channel 433 to the other end of the channel 433 and a first cavity 432 between the flange 423 and the channel 433. The first cavity 432 is preferably a rectangular cavity with a longitudinal axis parallel with the channel 433. The second side 427 includes a ledge 428 extending along its perimeter from one end of the channel 433 to the other end of the channel 433 and a second cavity 434 between the ledge 428 and the channel 433. The second cavity 434 is preferably a rectangular cavity with a longitudinal axis parallel with the channel 433.

Figure 6:
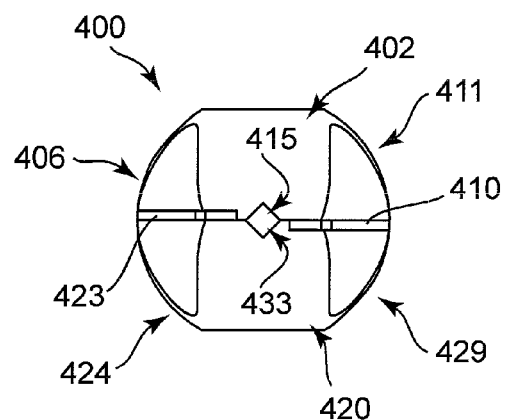
FIG. 6 is a side view of the retrofittable radio frequency identification connector shown in FIG. 5 turned ninety degrees.
Figure 7:
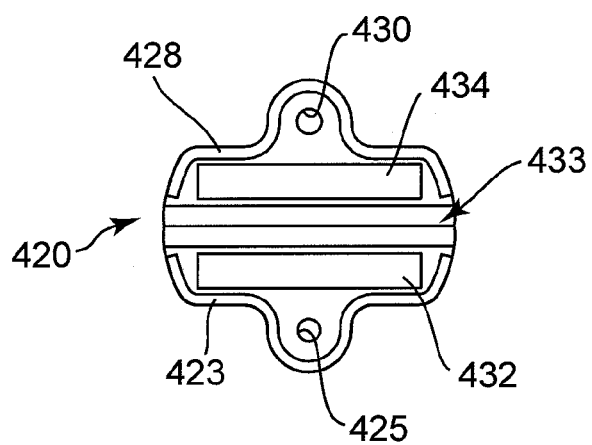
FIG. 7 is a top view of a housing portion of the retrofittable radio frequency identification connector shown in FIG. 3 showing a cavity of the housing portion.
Figure 8:
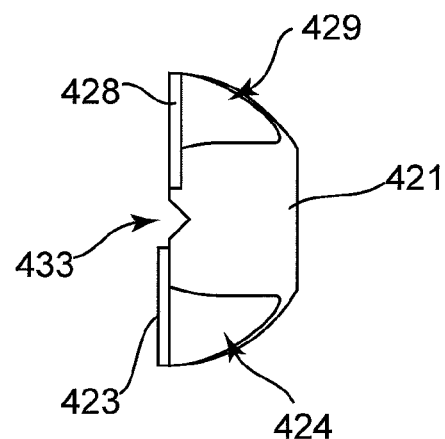
FIG. 8 is a right side view of the housing portion shown in FIG. 7.
Figure 9:
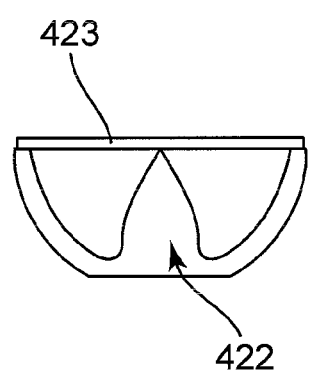
FIG. 9 is a bottom side view of the housing portion shown in FIG. 7.
Figure 10:
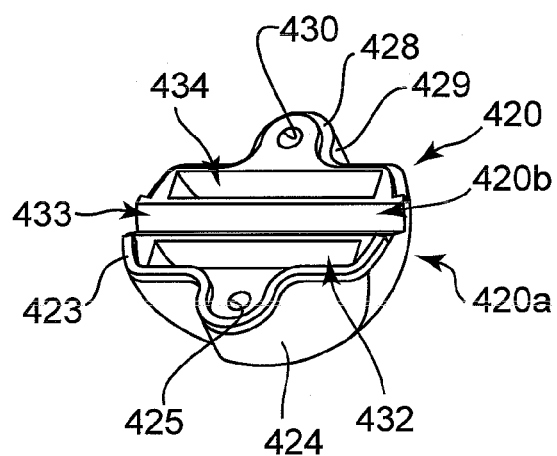
FIG. 10 is a perspective view of the housing portion shown in FIG. 7.
Figure 12:
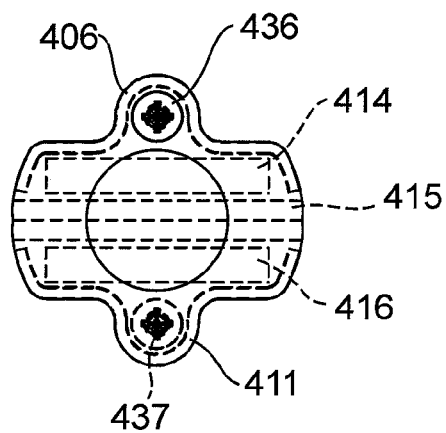
FIG. 12 is a top view with hidden lines of the retrofittable radio frequency identification connector shown in FIG. 11.
Figure 11:
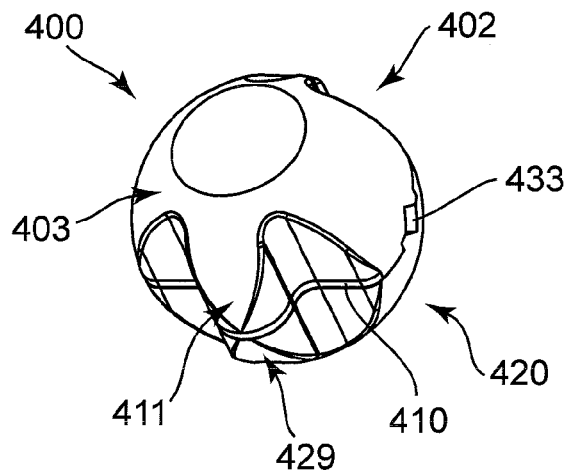
FIG. 11 is a top perspective view of the retrofittable radio frequency identification connector shown in FIG. 3 turned 180 degrees.
Figure 13:
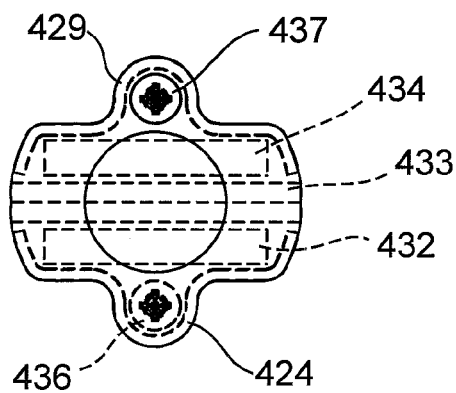
FIG. 13 is a bottom view with hidden lines of the retrofittable radio frequency identification connector shown in FIG. 11.
Figure 14:
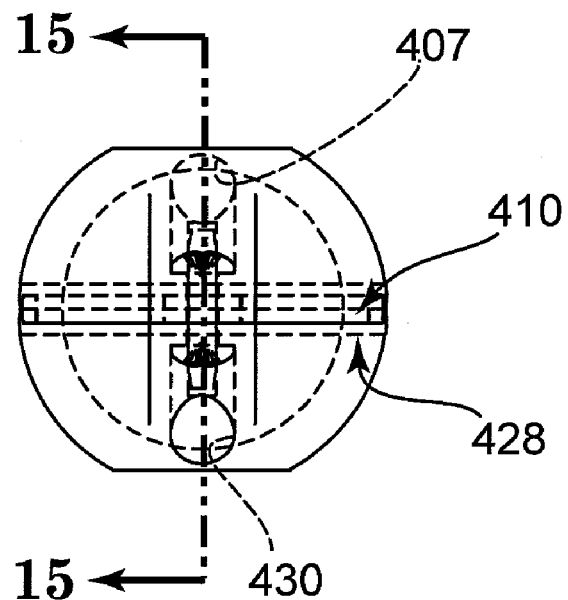
FIG. 14 is a side view with hidden lines of the retrofittable radio frequency identification connector shown in FIG. 11.
Figure 15:
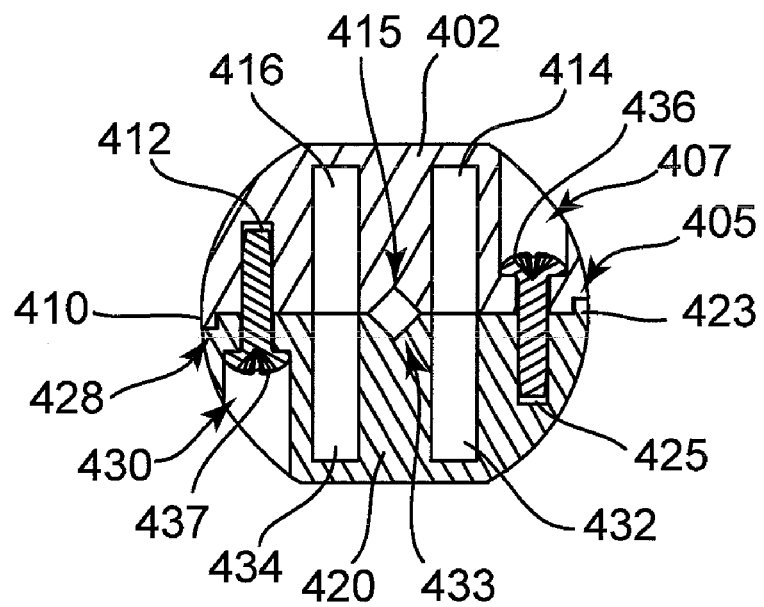
FIG. 15 is a cross-section view taken along the lines 15-15 of the retrofittable radio frequency identification connector shown in FIG. 14.
Figure 17:
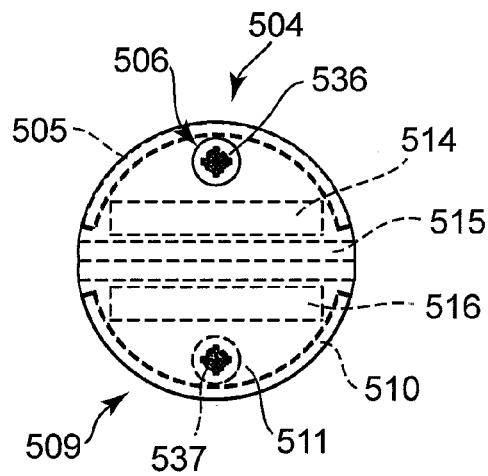
FIG. 17 is a top view with hidden lines of the retrofittable radio frequency identification connector shown in FIG. 16.

The first housing portion 402 and the second housing portion 420 are preferably substantially identical for ease of manufacture, but it is recognized that it is not necessary that they are identical. The first housing portion 402 and the second housing portion 420 mate together by positioning the inside surfaces so that they face one another. The central portions 403 and 421 align so that the first sides 404 and 422 and the second sides 409 and 427 align. The ledge 405 of the first side 404 provides a mating surface upon which the flange 423 of the first side 422 is positioned, and the ledge 428 of the second side 427 provides a mating surface upon which the flange 410 of the second side 409 is positioned. This is shown in FIG. 6. The channels 415 and 433, the first cavities 414 and 432, and the second cavities 416 and 434 align with one another. This is shown in FIG. 15. A fastener 436 is inserted through the bore 407 and into the threaded receptacle 425, and a fastener 437 is inserted through the bore 430 and into the threaded receptacle 412 to secure the housing portions 402 and 420 together. The fasteners 436 and 437 are preferably threaded screws. The diameters of the bores 407 and 430 narrow proximate the respective inside surfaces so that the heads of the screws cannot pass through the bores thus securing the housing portions 402 and 420 together when the threaded portions of the screws are threaded into the threaded receptacles 412 and 425. Although two fasteners are preferred, it is recognized that at least one or more fasteners may be used.

To attach the connector 400 to the cable 451 or any other suitable elongate member, the RFID device 445 is placed within any of the cavities 414, 416, 432, or 434. Preferably, only a portion of the RFID device 445 fits within any of the cavities 414, 416, 432, or 434 and the remaining portion extends outward therefrom. The cable 451 is placed within either of the channels 415 or 433. For illustrative purposes only, the RFID device 445 may be placed within the first cavity 432 and the cable 451 may be placed within the channel 433 of the second housing portion 420. This is shown in FIG. 2 showing an exploded perspective view. The first housing portion 402 is then positioned so that its inside surface faces the inside surface 420b of the second housing portion 420. The first cavity 414 is aligned with the first cavity 432, the channel 415 is aligned with the channel 433, and the second cavity 416 is aligned with the second cavity 434. Then the housing portions 402 and 420 are pushed together so that the RFID device 445 is positioned between the first cavities 414 and 432 and the cable 451 is positioned between the channels 415 and 433. The flange 423 is positioned proximate the ledge 405, and the flange 410 is positioned proximate the ledge 428. The fastener 436 is inserted through the bore 407 and into the threaded receptacle 425, and the fastener 437 is inserted through the bore 430 and into the threaded receptacle 412 to secure the housing portions 402 and 420 together. Preferably, the bore formed by the channels 415 and 433 has a smaller diameter than the diameter of the cable 451. Thus, the connector 400 exerts pressure on the cable 451 and squeezes the cable 451, preferably without damaging the cable 451, so that the connector 400 does not easily slide along the length of the cable 451.

Figure 16:
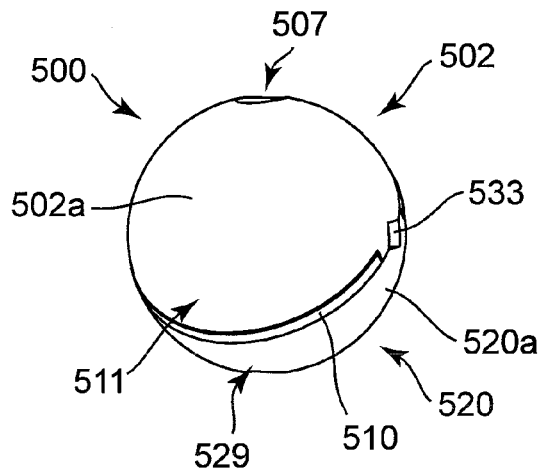
FIG. 16 is a top perspective view of another embodiment retrofittable radio frequency identification connector constructed according to the principles of the present invention.
Figure 18:
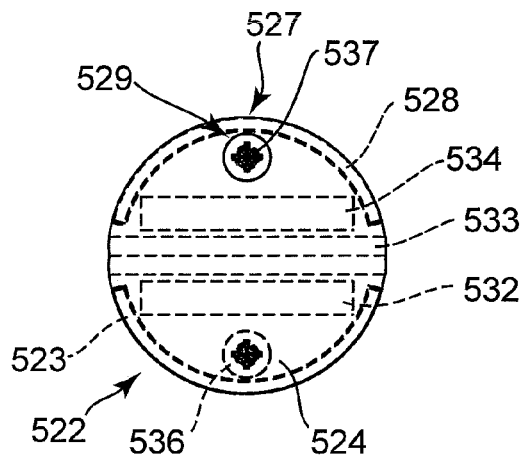
FIG. 18 is a bottom view with hidden lines of the retrofittable radio frequency identification connector shown in FIG. 16.
Figure 19:
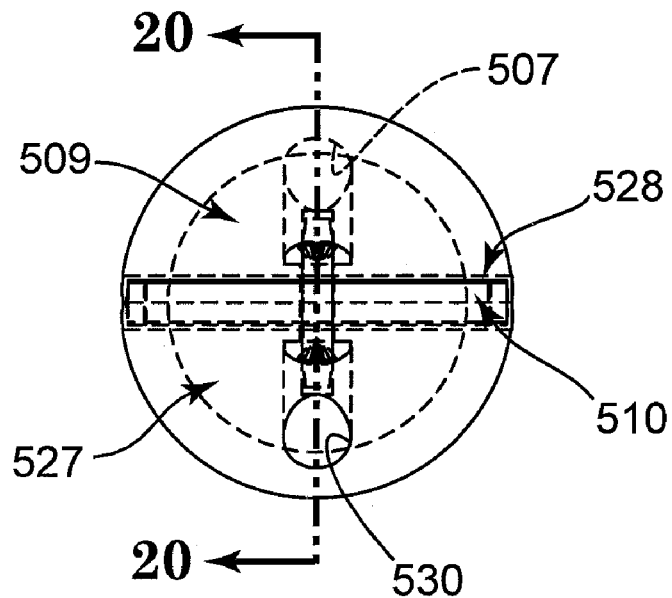
FIG. 19 is a side view with hidden lines of the retrofittable radio frequency identification connector shown in FIG. 16.

The RFID connector 500 is shown in FIGS. 16-20. The connector 500 includes mating housing portions, a first housing portion 502 and a second housing portion 520, configured and arranged to interconnect an RFID device (not shown) and a cable or an elongate member (not shown). The connector 500 is described herein in the orientation in which it is shown in FIG. 16, but this description does not limit the orientation in which the connector 500 may be used as the connector 500 may be used in many different orientations.

The first housing portion 502 includes an outside surface 502a and an inside surface (not shown). The outside surface 502a is preferably generally hemispherical-shaped and the inside surface is generally the planar surface of the hemisphere, which is generally circular-shaped. A fastener receiving portion 506 is proximate one side of the first housing portion 502 and includes a bore 507 extending through the fastener receiving portion 506 from proximate the outside surface 502a to proximate the inside surface. A fastener connecting portion 511 is proximate another side of the first housing portion 502, preferably opposite the fastener receiving portion 506, and includes a threaded receptacle 512 extending from proximate the inside surface toward the outside surface 502a without extending through the fastener connecting portion 511.

The inside surface includes a channel 515 extending through the first housing portion 502 proximate the diameter of the inside surface to define a first side 504 and a second side 509 on opposite sides of the channel 515. The first side 504 includes the fastener receiving portion 506, and the second side 509 includes the fastener connecting portion 511. The channel 515 is preferably a V-shaped groove The first side 504 includes a ledge 505 along its perimeter from one end of the channel 515 to the other end of the channel 515 and a first cavity 514 between the ledge 505 and the channel 515. The first cavity 514 is preferably a rectangular cavity with a longitudinal axis parallel with the channel 515. The second side 509 includes a flange 510 extending downward along its perimeter from one end of the channel 515 to the other end of the channel 515 and a second cavity 516 between the flange 510 and the channel 515. The second cavity 516 is preferably a rectangular cavity with a longitudinal axis parallel with the channel 515.

The second housing portion 520 includes an outside surface 520a and an inside surface (not shown). The outside surface 520a is preferably generally hemispherical-shaped and the inside surface is generally the planar surface of the hemisphere, which is generally circular-shaped A fastener connecting portion 524 is proximate one side of the second housing portion 520 and includes a threaded receptacle 525 extending from proximate the inside surface toward the outside surface 520a without extending through the fastener connecting portion 524. A fastener receiving portion 529 is proximate another side of the second housing portion 520, preferably opposite the fastener connecting portion 524, and includes a bore 530 extending through the fastener receiving portion 529 from proximate the outside surface 520a to proximate the inside surface.

The inside surface includes a channel 533 extending through the second housing portion 520 proximate the diameter of the inside surface to define a first side 522 and a second side 527 on opposite sides of the channel 533. The first side 522 includes the fastener connecting portion 524, and the second side 527 includes the fastener receiving portion 529. The channel 533 is preferably a V-shaped groove The first side 522 includes a flange 523 extending upward along its perimeter from one end of the channel 533 to the other end of the channel 533 and a first cavity 532 between the flange 523 and the channel 533. The first cavity 532 is preferably a rectangular cavity with a longitudinal axis parallel with the channel 533. The second side 527 includes a ledge 528 extending along its perimeter from one end of the channel 533 to the other end of the channel 533 and a second cavity 534 between the ledge 528 and the channel 533. The second cavity 534 is preferably a rectangular cavity with a longitudinal axis parallel with the channel 533.

Figure 20:
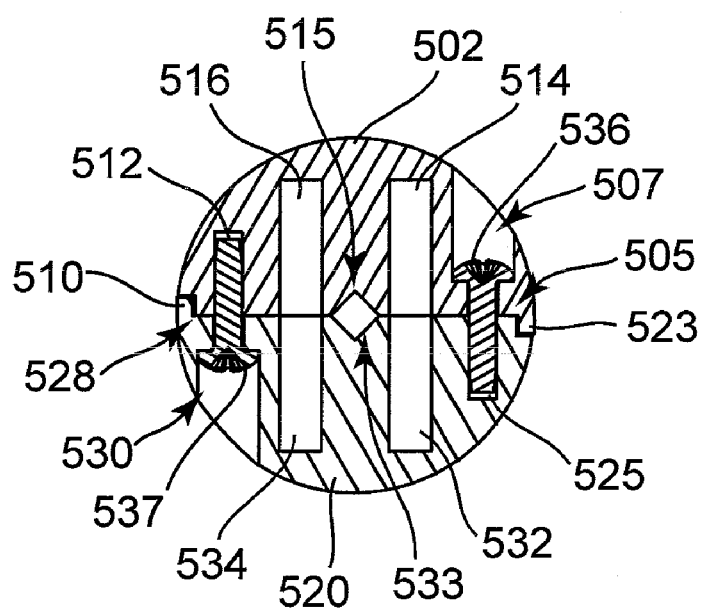
FIG. 20 is a cross-section view taken along the lines 20-20 of the retrofittable radio frequency identification connector shown in FIG. 19.

The first housing portion 502 and the second housing portion 520 are preferably substantially identical for ease of manufacture, but it is recognized that it is not necessary that they are identical. The first housing portion 502 and the second housing portion 520 mate together by positioning the inside surfaces so that they face one another and the first sides 504 and 522 and the second sides 509 and 527 align. The ledge 505 of the first side 504 provides a mating surface upon which the flange 523 of the first side 522 is positioned, and the ledge 528 of the second side 527 provides a mating surface upon which the flange 510 of the second side 509 is positioned. The channels 515 and 533, the first cavities 514 and 532, and the second cavities 516 and 534 align with one another. This is shown in FIG. 20, A fastener 536 is inserted through the bore 507 and into the threaded receptacle 525, and a fastener 537 is inserted through the bore 530 and into the threaded receptacle 512 to secure the housing portions 502 and 520 together. The fasteners 536 and 537 are preferably threaded screws. The diameters of the bores 507 and 530 narrow proximate the respective inside surfaces so that the heads of the screws cannot pass through the bores thus securing the housing portions 502 and 520 together when the threaded portions of the screws are threaded into the threaded receptacles 512 and 525. Although two fasteners are preferred, it is recognized that at least one or more fasteners may be used.

To attach the connector 500 to the cable or any other suitable elongate member, the RFID device is placed within any of the cavities 514, 516, 532, or 534. Preferably, only a portion of the RFID device fits within any of the cavities 514, 516, 532, or 534 and the remaining portion extends outward therefrom. The cable is placed within either of the channels 515 or 533. For illustrative purposes only, the RFID device may be placed within the first cavity 532 and the cable may be placed within the channel 533 of the second housing portion 520. The first housing portion 502 is then positioned so that its inside surface faces the inside surface 520b of the second housing portion 520. The first cavity 514 is aligned with the first cavity 532, the channel 515 is aligned with the channel 533, and the second cavity 516 is aligned with the second cavity 534. Then the housing portions 502 and 520 are pushed together so that the RFID device is positioned between the first cavities 514 and 532 and the cable is positioned between the channels 515 and 533. The flange 523 is positioned proximate the ledge 505, and the flange 510 is positioned proximate the ledge 528. The fastener 536 is inserted through the bore 507 and into the threaded receptacle 525, and the fastener 537 is inserted through the bore 530 and into the threaded receptacle 512 to secure the housing portions 502 and 520 together. Preferably, the bore formed by the channels 515 and 533 has a smaller diameter than the diameter of the cable. Thus, the connector 500 exerts pressure on the cable and squeezes the cable, preferably without damaging the cable, so that the connector 500 does not easily slide along the length of the cable.

Figure 21:
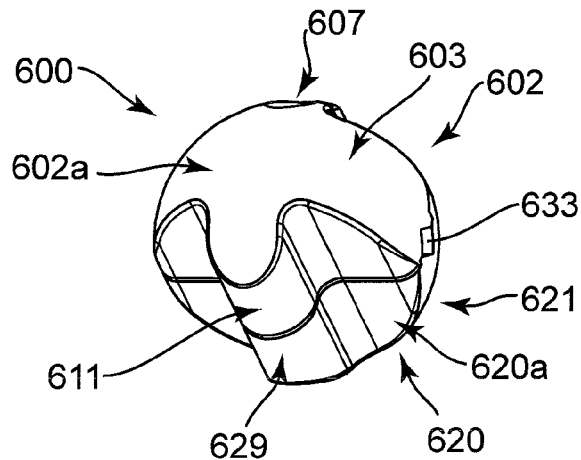
FIG. 21 is a top perspective view of another embodiment retrofittable radio frequency identification connector constructed according to the principles of the present invention.

The RFID connector 600 is shown in FIGS. 21-25. The connector 600 includes mating housing portions, a first housing portion 602 and a second housing portion 620, configured and arranged to interconnect an RFID device (not shown) and a cable or an elongate member (not shown). The connector 600 is described herein in the orientation in which it is shown in FIG. 21, but this description does not limit the orientation in which the connector 600 may be used as the connector 600 may be used in many different orientations.

Figure 22:
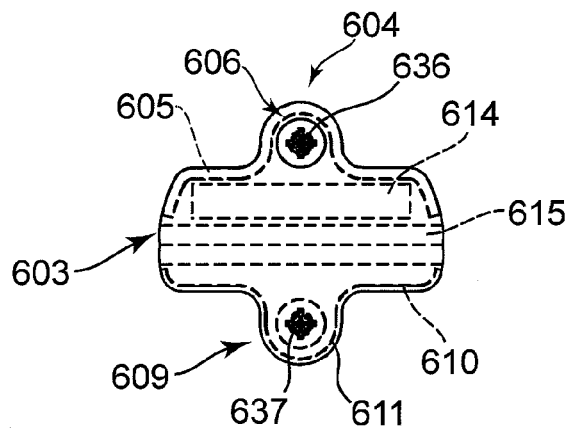
FIG. 22 is a top view with hidden lines of the retrofittable radio frequency identification connector shown in FIG. 21.

The first housing portion 602 includes an outside surface 602a and an inside surface (not shown). The outside surface 602a includes a central portion 603 that is arched along its longitudinal axis so that the top is higher than the ends. A fastener receiving portion 606 extends outward from one side of the central portion 603 proximate the top and includes a bore 607 extending through the fastener receiving portion 606 perpendicular relative to the longitudinal axis of the central portion 603. A fastener connecting portion 611 extends outward from the opposite side of the central portion 603 proximate the top and includes a threaded receptacle 612 extending from proximate the inside surface toward the outside surface 602a without extending through the fastener connecting portion 611 perpendicular relative to the longitudinal axis of the central portion 603. The first housing portion 602 is generally hemispherical-shaped with notches on each side of the fastener receiving portion 606 and on each side of the fastener connecting portion 611 as shown in FIG. 22.

The inside surface includes a channel 615 extending longitudinally through the first housing portion 602, which defines a first side 604 and a second side 609 on opposite sides of the channel 615, parallel with the longitudinal axis of the central portion 603. The first side 604 includes the fastener receiving portion 606, and the second side 609 includes the fastener connecting portion 611. The channel 615 is preferably a V-shaped groove. The first side 604 includes a ledge 605 along its perimeter from one end of the channel 615 to the other end of the channel 615 and a cavity 614 between the ledge 605 and the channel 615. The cavity 614 is preferably a rectangular cavity with a longitudinal axis parallel with the channel 615. The second side 609 includes a flange 610 extending downward along its perimeter from one end of the channel 615 to the other end of the channel 615.

Figure 23:
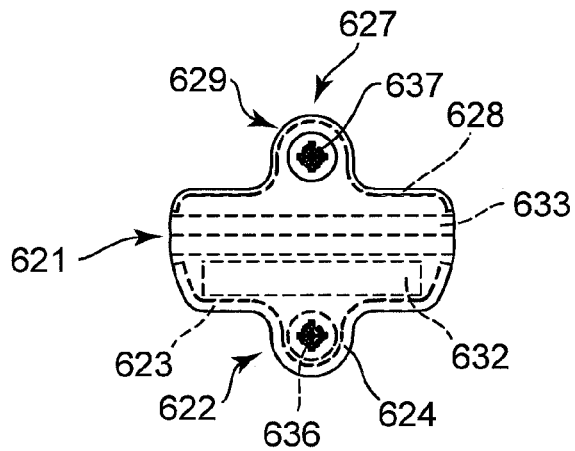
FIG. 23 is a bottom view with hidden lines of the retrofittable radio frequency identification connector shown in FIG. 21.
Figure 24:
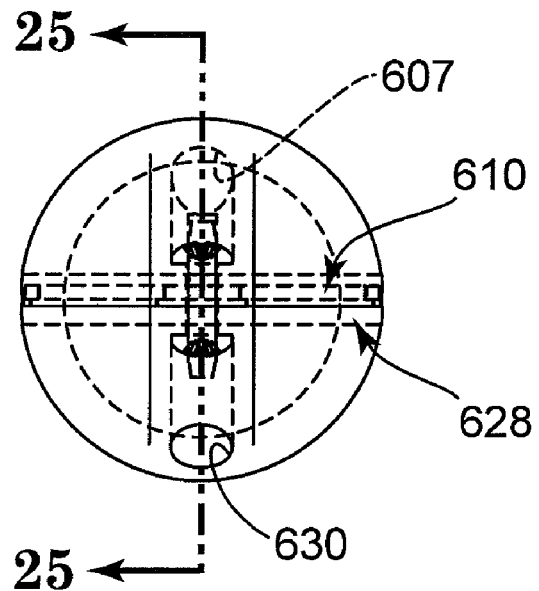
FIG. 24 is a side view with hidden lines of the retrofittable radio frequency identification connector shown in FIG. 21.

The second housing portion 620 includes an outside surface 620*a* and an inside surface (not shown). The outside surface 620*a* includes a central portion 621 that is arched along its longitudinal axis so that the top is higher than the ends. A fastener connecting portion 624 extends outward from one side of the central portion 621 proximate the top and includes a threaded receptacle 625 extending from proximate the inside surface toward the outside surface 620*a* without extending through the fastener connecting portion 624 perpendicular relative to the longitudinal axis of the central portion 621. A fastener receiving portion 629 extends outward from the opposite side of the central portion 621 proximate the top and includes a bore 630 extending through the fastener receiving portion 629 perpendicular relative to the longitudinal axis of the central portion 621. The second housing portion 620 is generally hemispherical-shaped with notches on each side of the fastener connecting portion 624 and on each side of the fastener receiving portion 629 as shown in FIG. 23.

The inside surface includes a channel 633 extending longitudinally through the second housing portion 620, which defines a first side 622 and a second side 627 on opposite sides of the channel 633, parallel with the longitudinal axis of the central portion 621. The first side 622 includes the fastener connecting portion 624, and the second side 627 includes the fastener receiving portion 629. The channel 633 is preferably a V-shaped groove. The first side 622 includes a flange 623 extending upward along its perimeter from one end of the channel 633 to the other end of the channel 633 and a cavity 632 between the flange 623 and the channel 633. The cavity 632 is preferably a rectangular cavity with a longitudinal axis parallel with the channel 633. The second side 627 includes a ledge 628 extending along its perimeter from one end of the channel 633 to the other end of the channel 633.

Figure 25:
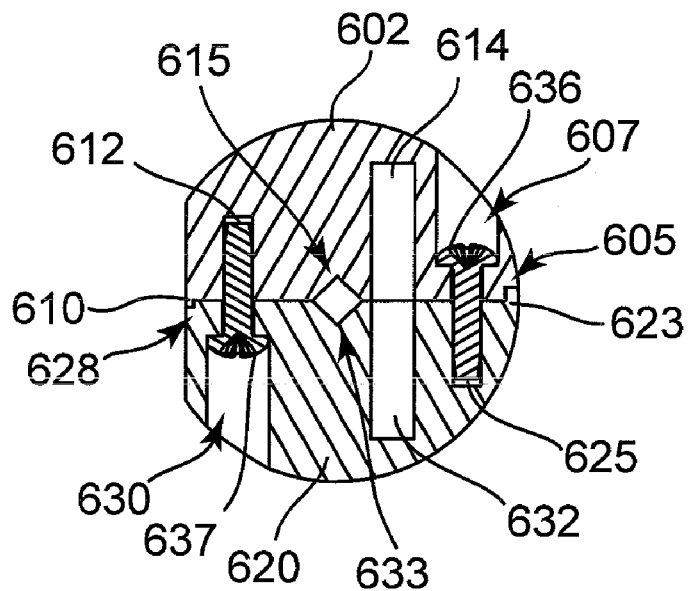
FIG. 25 is a cross-section view taken along the lines 25-25 of the retrofittable radio frequency identification connector shown in FIG. 24.
Figure 27:
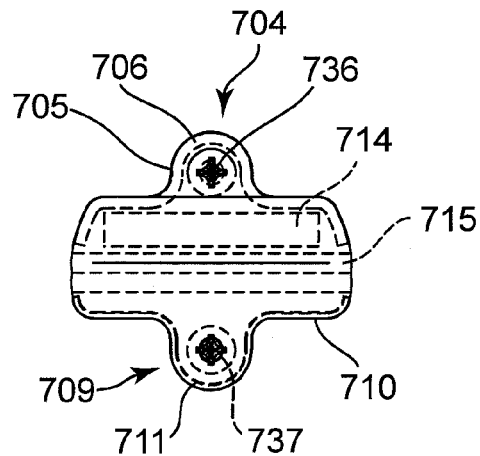
FIG. 27 is a top view with hidden lines of the retrofittable radio frequency identification connector shown in FIG. 26.

The first housing portion 602 and the second housing portion 620 mate together by positioning the inside surfaces so that they face one another. The central portions 603 and 621 align so that the first sides 604 and 622 and the second sides 609 and 627 align. The ledge 605 of the first side 604 provides a mating surface upon which the flange 623 of the first side 622 is positioned, and the ledge 628 of the second side 627 provides a mating surface upon which the flange 610 of the second side 609 is positioned. This is shown in FIG. 25. The channels 615 and 633 and the cavities 614 and 632 align with one another. A fastener 636 is inserted through the bore 607 and into the threaded receptacle 625, and a fastener 637 is inserted through the bore 630 and into the threaded receptacle 612 to secure the housing portions 602 and 620 together. The fasteners 636 and 637 are preferably threaded screws. The diameters of the bores 607 and 630 narrow proximate the respective inside surfaces so that the heads of the screws cannot pass through the bores thus securing the housing portions 602 and 620 together when the threaded portions of the screws are threaded into the threaded receptacles 612 and 625. Although two fasteners are preferred, it is recognized that at least one or more fasteners may be used.

To attach the connector 600 to the cable or any other suitable elongate member, the RFID device is placed within one of the cavities 614 or 632. Preferably, only a portion of the RFID device fits within one of the cavities 614 or 632 and the remaining portion extends outward therefrom. The cable is placed within either of the channels 615 or 633. For illustrative purposes only, the RFID device may be placed within the cavity 632 and the cable may be placed within the channel 633 of the second housing portion 620. The first housing portion 602 is then positioned so that its inside surface faces the inside surface of the second housing portion 620. The cavity 614 is aligned with the cavity 632 and the channel 615 is aligned with the channel 633. Then the housing portions 602 and 620 are pushed together so that the RFID device is positioned between the cavities 614 and 632 and the cable is positioned between the channels 615 and 633. The flange 623 is positioned proximate the ledge 605, and the flange 610 is positioned proximate the ledge 628. The fastener 636 is inserted through the bore 607 and into the threaded receptacle 625, and the fastener 637 is inserted through the bore 630 and into the threaded receptacle 612 to secure the housing portions 602 and 620 together. Preferably, the bore formed by the channels 615 and 633 has a smaller diameter than the diameter of the cable. Thus, the connector 600 exerts pressure on the cable and squeezes the cable, preferably without damaging the cable, so that the connector 600 does not easily slide along the length of the cable.

Figure 26:
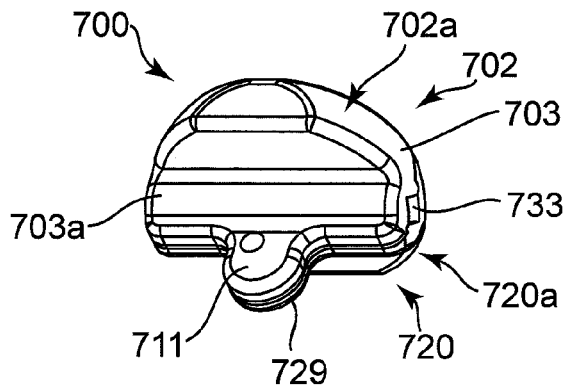
FIG. 26 is a top perspective view of another embodiment retrofittable radio frequency identification connector constructed according to the principles of the present invention.
Figure 28:
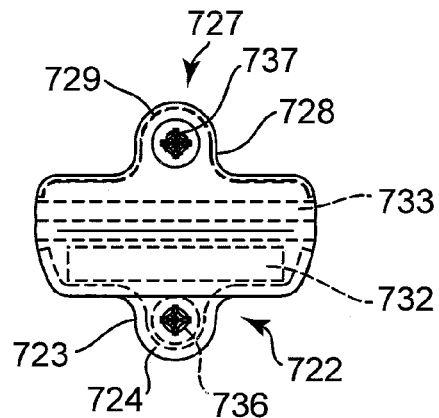
FIG. 28 is a bottom view with hidden lines of the retrofittable radio frequency identification connector shown in FIG. 26.
Figure 29:
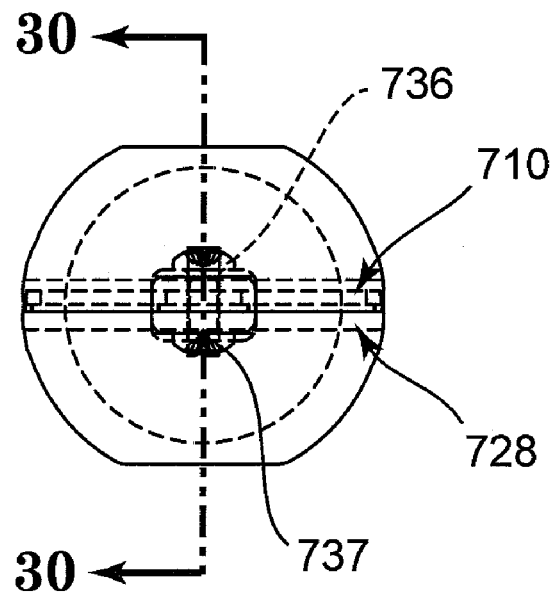
FIG. 29 is a side view with hidden lines of the retrofittable radio frequency identification connector shown in FIG. 26.

The RFID connector 700 is shown in FIGS. 26-30. The connector 700 includes mating housing portions, a first housing portion 702 and a second housing portion 720, configured and arranged to interconnect an RFID device (not shown) and a cable or an elongate member (not shown). The connector 700 is described herein in the orientation in which it is shown in FIG. 26, but this description does not limit the orientation in which the connector 700 may be used as the connector 700 may be used in many different orientations.

The first housing portion 702 includes an outside surface 702*a* and an inside surface (not shown). The outside surface 702*a* includes an arched portion 703 that is arched along its longitudinal axis so that the top is higher than the ends and an adjacent portion 703*a* that extends along the bottom of the arched portion 703. A fastener receiving portion 706 extends outward from the arched portion 703 on the side opposite the adjacent portion 703*a* and includes a bore 707 extending through the fastener receiving portion 706 perpendicular relative to the longitudinal axis of the arched portion 703 and the adjacent portion 703*a*. A fastener connecting portion 711 extends outward from the adjacent portion 703*a* on the side opposite the arched portion 703 and includes a threaded receptacle 712 extending through the fastener connecting portion 711 perpendicular relative to the longitudinal axis of the arched portion 703 and the adjacent portion 703*a*.

The inside surface includes a channel 715 extending longitudinally through the first housing portion 702, which defines a first side 704 and a second side 709 on opposite sides of the channel 715. The channel 715 corresponds with the adjacent portion 703*a* and is parallel with the longitudinal axis of the adjacent portion 703*a*. The first side 704 includes the fastener receiving portion 706, and the second side 709 includes the fastener connecting portion 711. The channel 715 is preferably a V-shaped groove. The first side 704 includes a ledge 705 along its perimeter from one end of the channel 715 to the other end of the channel 715 and a cavity 714 between the ledge 705 and the channel 715. The cavity 714 corresponds with the arched portion 703 and is preferably a rectangular cavity with a longitudinal axis parallel with the channel 715. The second side 709 includes a flange 710 extending downward along its perimeter from one end of the channel 715 to the other end of the channel 715.

The second housing portion 720 includes an outside surface 720a and an inside surface (not shown). The outside surface 720a includes an arched portion 721 that is arched along its longitudinal axis so that the top is higher than the ends and an adjacent portion 721a that extends along the bottom of the arched portion 721. A fastener connecting portion 724 extends outward from the arched portion 721 on the side opposite the adjacent portion 721a and includes a threaded receptacle 725 extending through the fastener connecting portion 724 perpendicular relative to the longitudinal axis of the arched portion 721 and the adjacent portion 721a. A fastener receiving portion 729 extends outward from the adjacent portion 721a on the side opposite the arched portion 721 and includes a bore 730 extending through the fastener receiving portion 729 perpendicular relative to the longitudinal axis of the arched portion 721 and the adjacent portion 721a.

The inside surface includes a channel 733 extending longitudinally through the second housing portion 720, which defines a first side 722 and a second side 727 on opposite sides of the channel 733. The channel 733 corresponds with the adjacent portion 721a and is parallel with the longitudinal axis of the adjacent portion 721a. The first side 722 includes the fastener connecting portion 724, and the second side 727 includes the fastener receiving portion 729. The channel 733 is preferably a V-shaped groove. The first side 722 includes a flange 723 extending upward along its perimeter from one end of the channel 733 to the other end of the channel 733 and a cavity 732 between the flange 723 and the channel 733. The cavity 732 corresponds with the arched portion 721 and is preferably a rectangular cavity with a longitudinal axis parallel with the channel 733. The second side 727 includes a ledge 728 extending along its perimeter from one end of the channel 733 to the other end of the channel 733.

Figure 30:
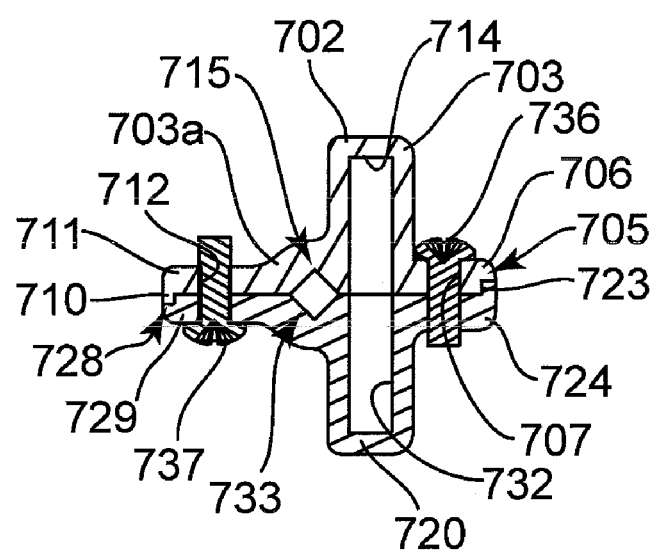
FIG. 30 is a cross-section view taken along the lines 30-30 of the retrofittable radio frequency identification connector shown in FIG. 29.

The first housing portion 702 and the second housing portion 720 mate together by positioning the inside surfaces so that they face one another. The arched portions 703 and 721 and the adjacent portions 703a and 721a align so that the first sides 704 and 722 and the second sides 709 and 727 align. The ledge 705 of the first side 704 provides a mating surface upon which the flange 723 of the first side 722 is positioned, and the ledge 728 of the second side 727 provides a mating surface upon which the flange 710 of the second side 709 is positioned. This is shown in FIG. 30. The channels 715 and 733 and the cavities 714 and 732 align with one another. A fastener 736 is inserted through the bore 707 and into the threaded receptacle 725, and a fastener 737 is inserted through the bore 730 and into the threaded receptacle 712 to secure the housing portions 702 and 720 together. The fasteners 736 and 737 are preferably threaded screws. The diameters of the bores 707 and 730 narrow proximate the respective inside surfaces so that the heads of the screws cannot pass through the bores thus securing the housing portions 702 and 720 together when the threaded portions of the screws are threaded into the threaded receptacles 712 and 725. Although two fasteners are preferred, it is recognized that at least one or more fasteners may be used.

To attach the connector 700 to the cable or any other suitable elongate member, the RFID device is placed within one of the cavities 714 or 732. Preferably, only a portion of the RFID device fits within one of the cavities 714 or 732 and the remaining portion extends outward therefrom. The cable is placed within either of the channels 715 or 733. For illustrative purposes only, the RFID device may be placed within the cavity 732 and the cable may be placed within the channel 733 of the second housing portion 720. The first housing portion 702 is then positioned so that its inside surface faces the inside surface of the second housing portion 720. The cavity 714 is aligned with the cavity 732 and the channel 715 is aligned with the channel 733. Then the housing portions 702 and 720 are pushed together so that the RFID device is positioned between the cavities 714 and 732 and the cable is positioned between the channels 715 and 733. The flange 723 is positioned proximate the ledge 705, and the flange 710 is positioned proximate the ledge 728. The fastener 736 is inserted through the bore 707 and into the threaded receptacle 725, and the fastener 737 is inserted through the bore 730 and into the threaded receptacle 712 to secure the housing portions 702 and 720 together. Preferably, the bore formed by the channels 715 and 733 has a smaller diameter than the diameter of the cable. Thus, the connector 700 exerts pressure on the cable and squeezes the cable, preferably without damaging the cable, so that the connector 700 does not easily slide along the length of the cable.

The connector preferably includes at least a channel. Although the RFID device is shown and described as being contained within a cavity of the connector, it is recognized that the RFID device may be otherwise operatively connected to the connector by other suitable capturing, securing, or supporting means. Further, a cavity may be optional as the identification device may be operatively connected to an exterior surface or portion of the connector. The features of the embodiments may be interchangeable.

Once the connector is connected to the safety device, the connector can be located and the identifying information of the connector can be scanned. The identifying information of the connector is linked to data stored in a computer database where the inspection and maintenance log information can be entered and saved for the safety device. Examples of how this can be accomplished are disclosed in the following co-pending applications, the entire contents of which are hereby incorporated by reference in their entirety: (1) "Method of Facilitating Controlled Flow of Information for Safety Equipment Items and Database Related Thereto" by Dean R. Kaartinen et al., U.S. patent application Ser. No. 11/759,148, filed Jun. 6, 2007; (2) "Direct Data Input For Database For Safety Equipment Items and Method" by Dean R. Kaartinen et al., U.S. patent application Ser. No. 11/759,152, filed Jun. 6, 2007; (3) "Method of Retrofitting Safety Equipment Items and Database" by Dean R. Kaartinen et al., U.S. patent application Ser. No. 11/759,158, filed Jun. 6, 2007, and (4) "Centralized Database of Information Related to Inspection of Safety Equipment Items Inspection and Method" by Dean R. Kaartinen et al., U.S. patent application Ser. No. 11/759,175, filed Jun. 6, 2007. The scanning of the identifying information of the connector makes recordation of the inspection and maintenance log information in the computer database easy because the connector is easily accessible and convenient to use regardless if the safety device is soiled.

The above specification, examples and data provide a complete description of the manufacture and use of the composition of the invention. Since many embodiments of the invention can be made without departing from the spirit and scope of the invention, the invention resides in the claims hereinafter appended.

I claim:

1. An identification device connector assembly configured and arranged for retrofittable connection of an identification device to an elongate member, comprising:

a) a connector including a first portion, a second portion, and a bore, the first portion and the second portion defining the bore and being releasably connectable, the bore being configured and arranged to receive the elongate member.

2. The assembly of claim 1, wherein the first and second portions exert pressure on the elongate member thereby preventing the connector from sliding along a length of the elongate member.

3. The assembly of claim 1, wherein the first portion includes a first channel and the second portion includes a second channel, the first channel and the second channel defining the bore.

4. The assembly of claim 1, further comprising a cavity, the first portion and the second portion defining the cavity, the cavity being configured and arranged to receive the identification device.

5. The assembly of claim 4, wherein the first portion includes a first cavity and the second portion includes a second cavity, the first cavity and the second cavity defining the cavity.

6. The assembly of claim 1, wherein the first portion and the second portion are substantially identical.

7. The assembly of claim 1, wherein the first portion has a first inside surface including a first cavity and a first channel, the second portion has a second inside surface including a second cavity and a second channel, the first and second inside surfaces facing one another when the connector is assembled, the first and second cavities being aligned and in fluid communication with one another when the connector is assembled, the first and second channels being aligned and in fluid communication with one another when the connector is assembled, the first and second cavities being configured and arranged to receive the identification device, and the first and second channels being configured and arranged to receive the elongate member.

8. An identification device connector assembly configured and arranged for retrofittable connection to an elongate member, comprising:
 a) an identification device; and
 b) a housing including mating first and second housing portions, the first housing portion having a first inside surface including a first cavity and a first channel, the second housing portion having a second inside surface including a second cavity and a second channel, the first and second inside surfaces facing one another when the housing is assembled, the first and second cavities being aligned and in fluid communication with one another when the housing is assembled, the first and second channels being aligned and in fluid communication with one another when the housing is assembled, the first and second cavities being configured and arranged to receive the identification device, and the first and second channels being configured and arranged to receive the elongate member.

9. The assembly of claim 8, wherein the elongate member is sandwiched between the first and second housing portions within the first and second channels, the housing exerting pressure on the elongate member thereby preventing the housing from sliding along a length of the elongate member.

10. The assembly of claim 8, wherein the identification device is placed within the first cavity and the elongate member is placed within the first channel and then the second housing portion is connected to the first housing portion so that the identification device is positioned within the first and second cavities and the elongate member is positioned within the first and second channels.

11. The assembly of claim 8, wherein the first and second housing portions are substantially identical.

12. The assembly of claim 8, wherein the first and second housing portions are secured to one another with a fastener.

13. The assembly of claim 8, wherein the identification device is a radio frequency identification device.

14. A method of connecting an identification device to an elongate member using a connector including first and second housing portions forming a cavity and a channel, the first and second housing portions being releasably connectable, comprising:
 a) separating the first and second housing portions;
 b) placing the identification device within the cavity;
 c) placing the elongate member within the channel; and
 d) connecting the first and second housing portions thus securing the identification device and the elongate member between the first and second housing portions.

15. The method of claim 14, wherein the first and second housing portions exert pressure on the elongate member thereby preventing the first and second housing portions from sliding along a length of the elongate member.

16. The method of claim 14, wherein the first housing portion includes a first cavity and the second housing portion includes a second cavity, the first and second cavities forming the cavity, and wherein the identification device is positioned within the first cavity of the first housing portion and within the second cavity of the second housing portion.

17. The method of claim 14, wherein the first housing portion includes a first channel and the second housing portion includes a second channel, the first and second channels forming the channel, and wherein the elongate member is positioned within the first channel of the first housing portion and within the second channel of the second housing portion.

18. The method of claim 14, further comprising securing the first and second housing portions together with a fastener.

* * * * *

UNITED STATES PATENT AND TRADEMARK OFFICE
CERTIFICATE OF CORRECTION

PATENT NO. : 7,843,349 B2  Page 1 of 1
APPLICATION NO. : 11/759384
DATED : November 30, 2010
INVENTOR(S) : Bradley A. Rohlf It is certified that error appears in the above-identified patent and that said Letters Patent is hereby corrected as shown below:

On the title page, item [56];

Page 2, Column 2, Line 6: "Scafftage®" should read --Scafftag®--.

Column 5, Line 39: "...groove The first..." should read --...groove. The first...--.

Column 7, Line 5: "...groove The first..." should read --...groove. The first...--.

Column 7, Line 38: "...groove The first..." should read --...groove. The first...--.

Signed and Sealed this
Fifteenth Day of March, 2011

David J. Kappos
*Director of the United States Patent and Trademark Office*